Figure 6:
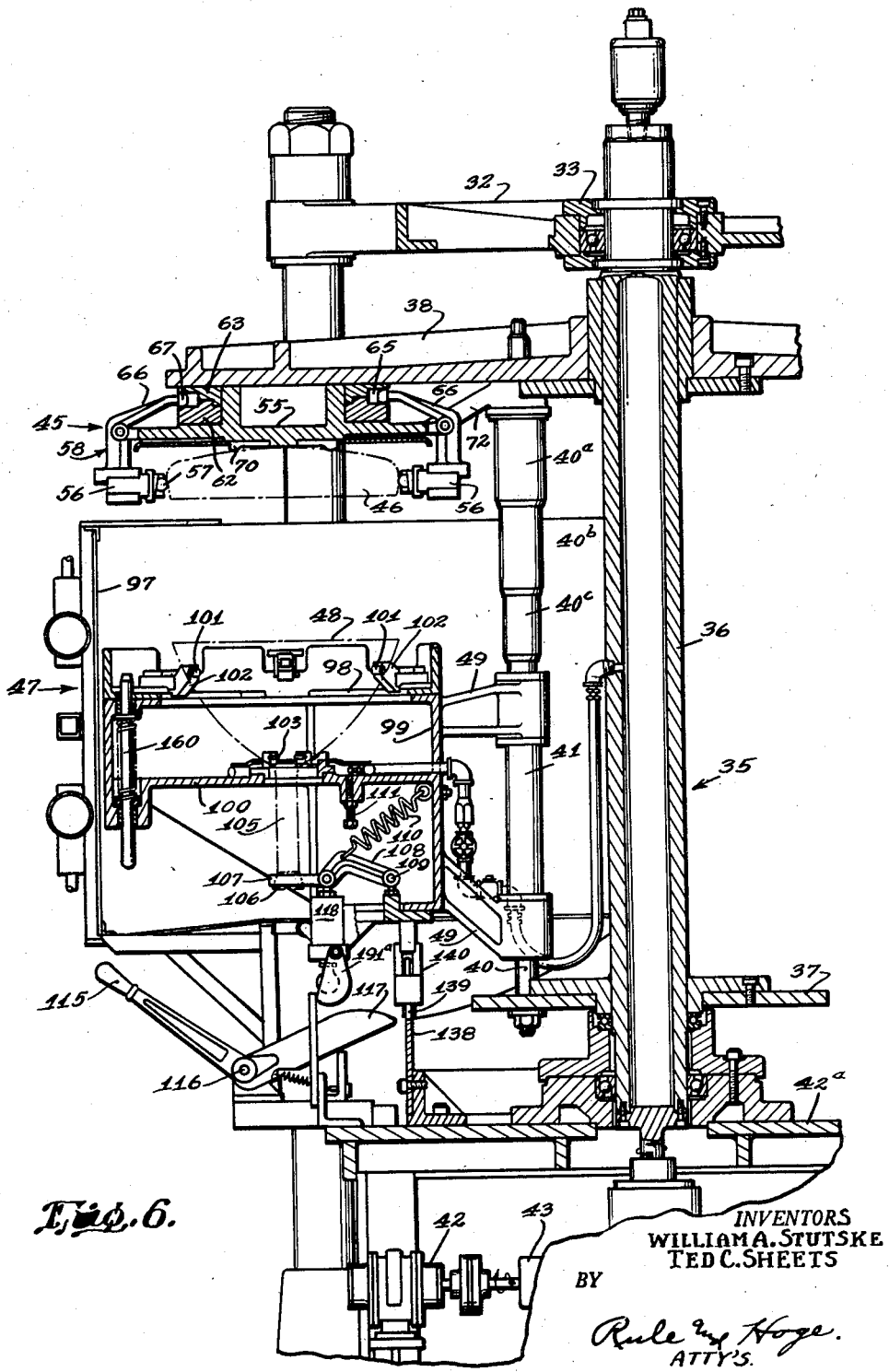

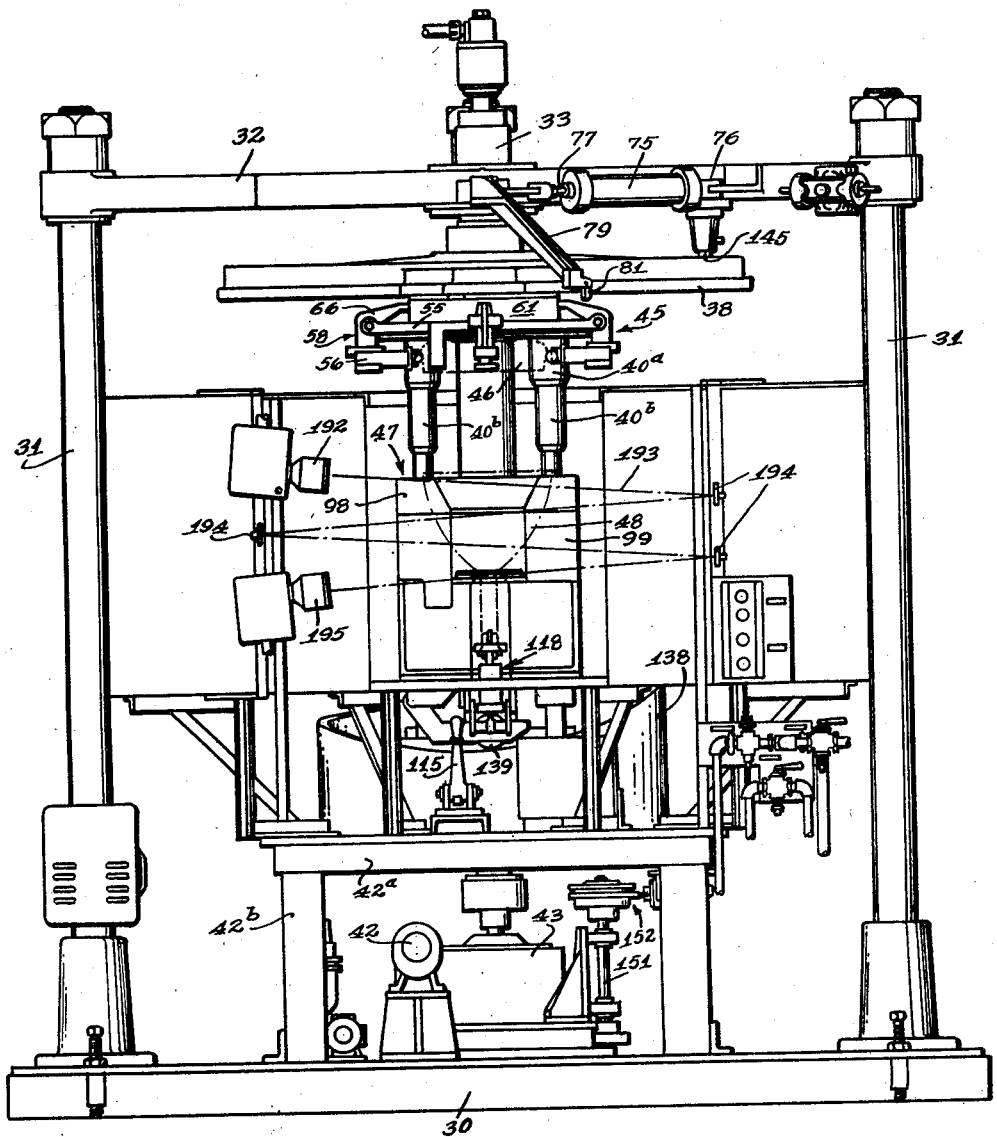

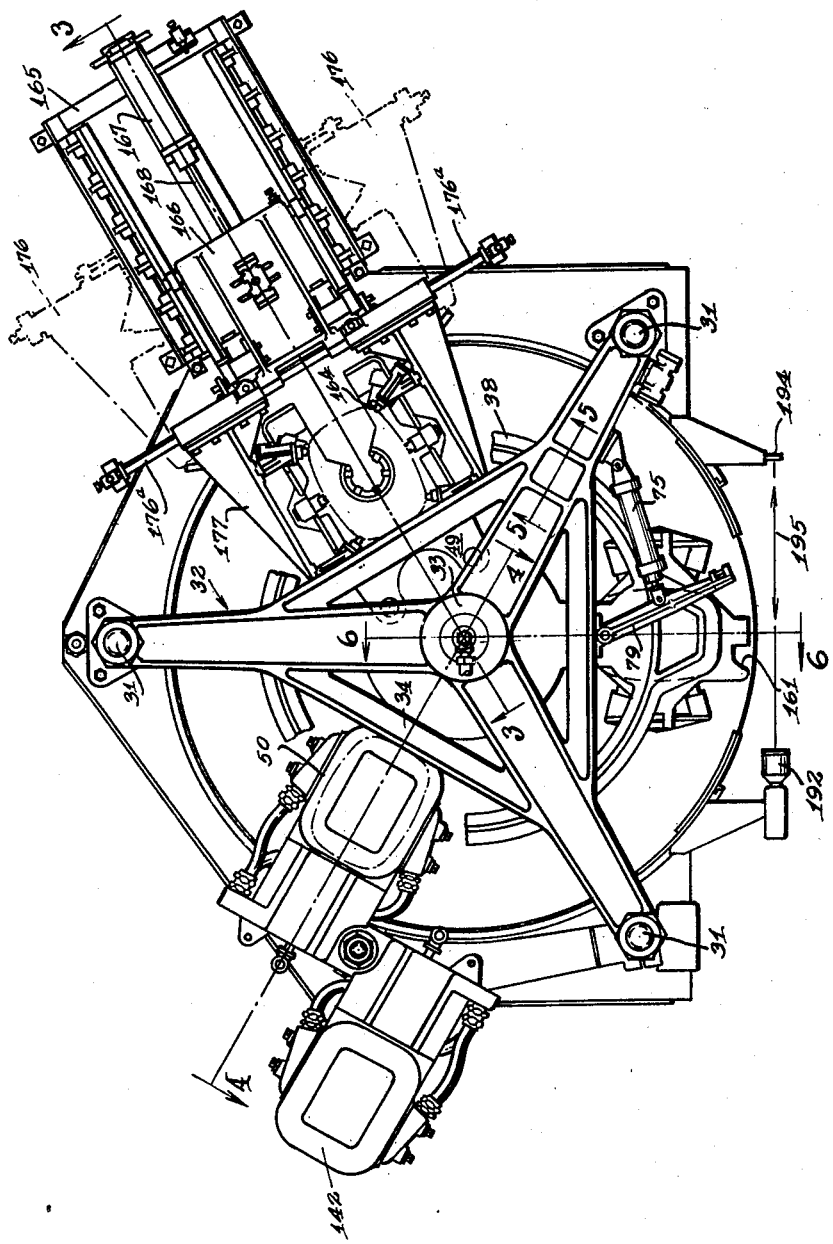

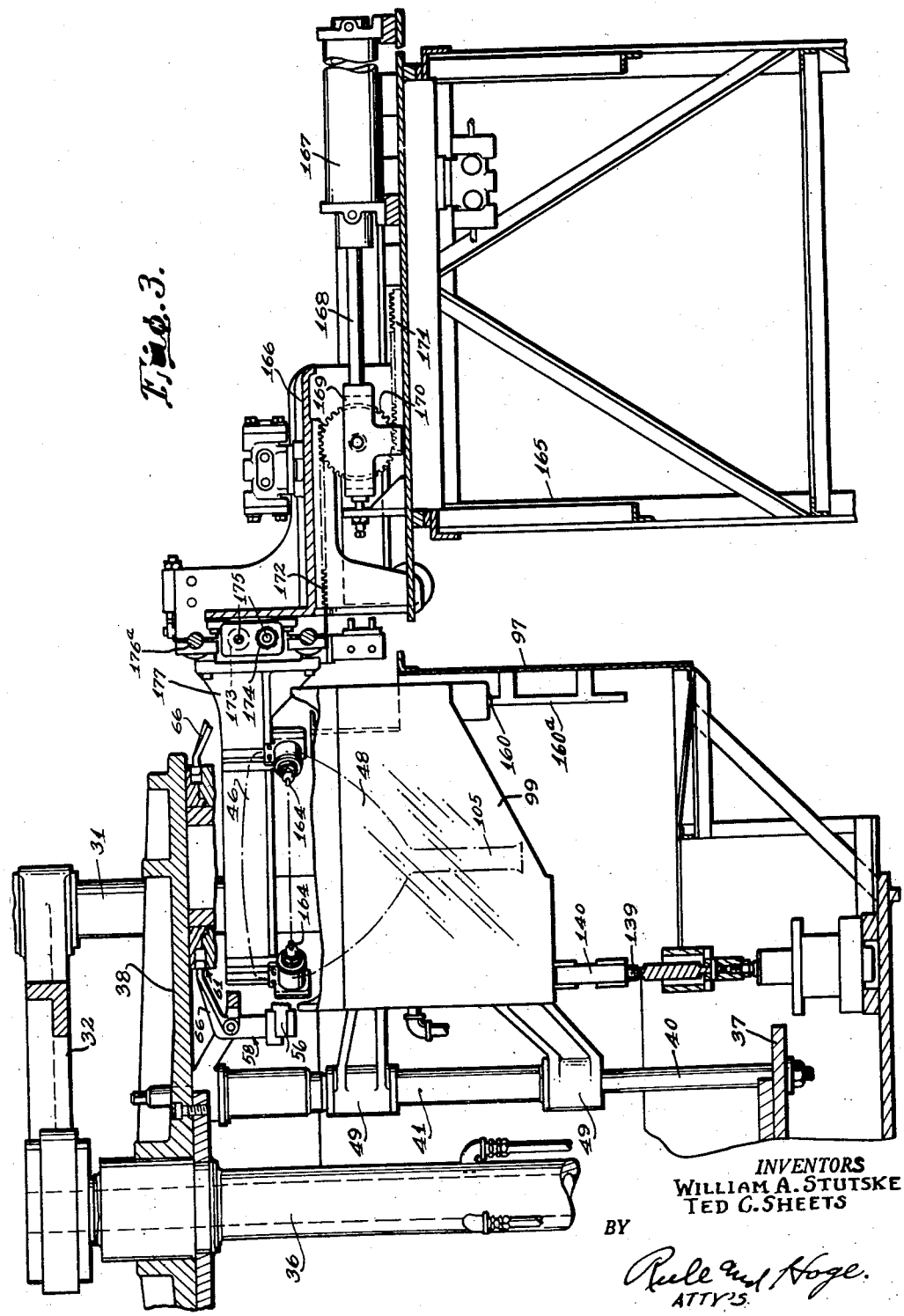

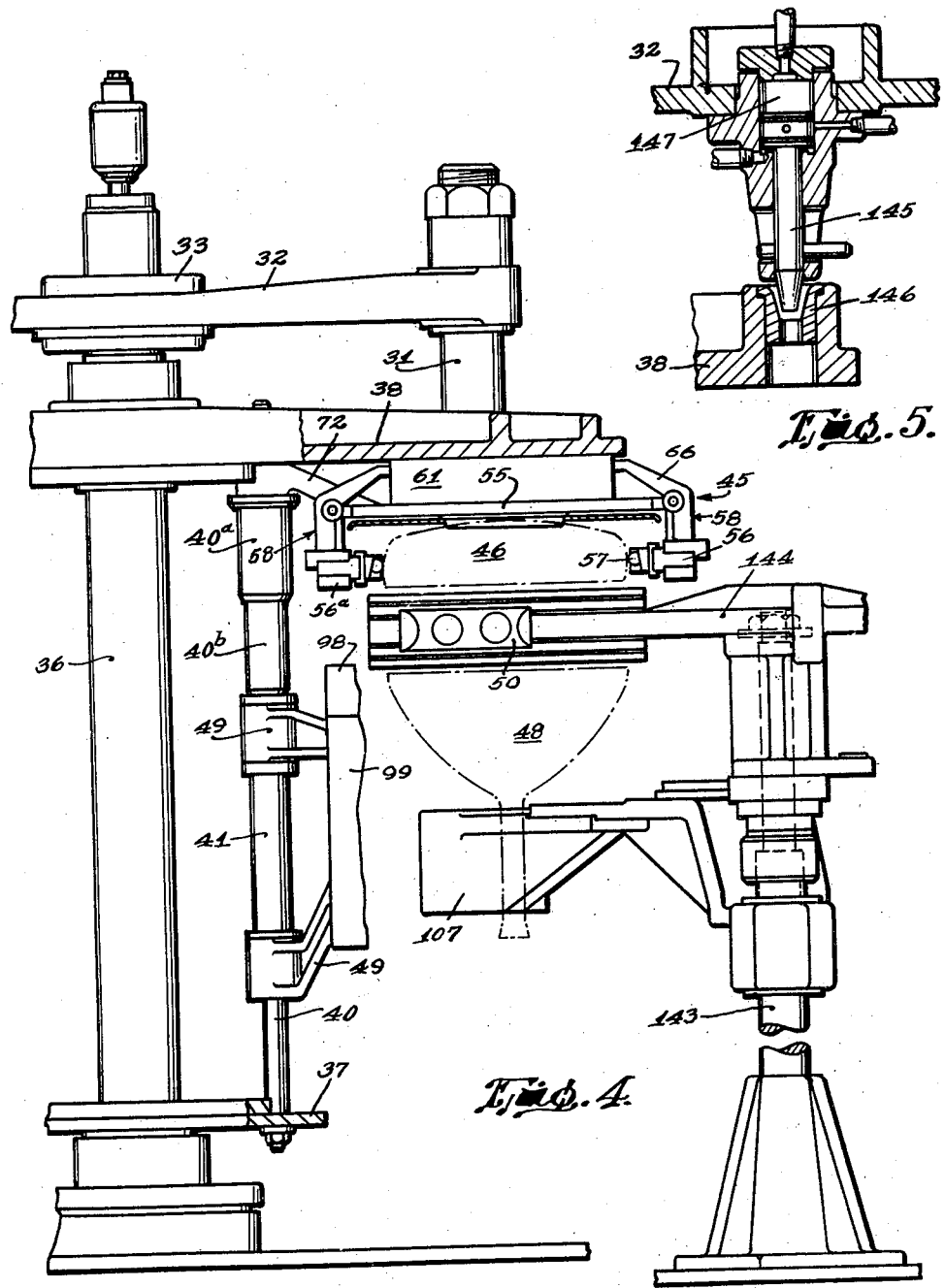

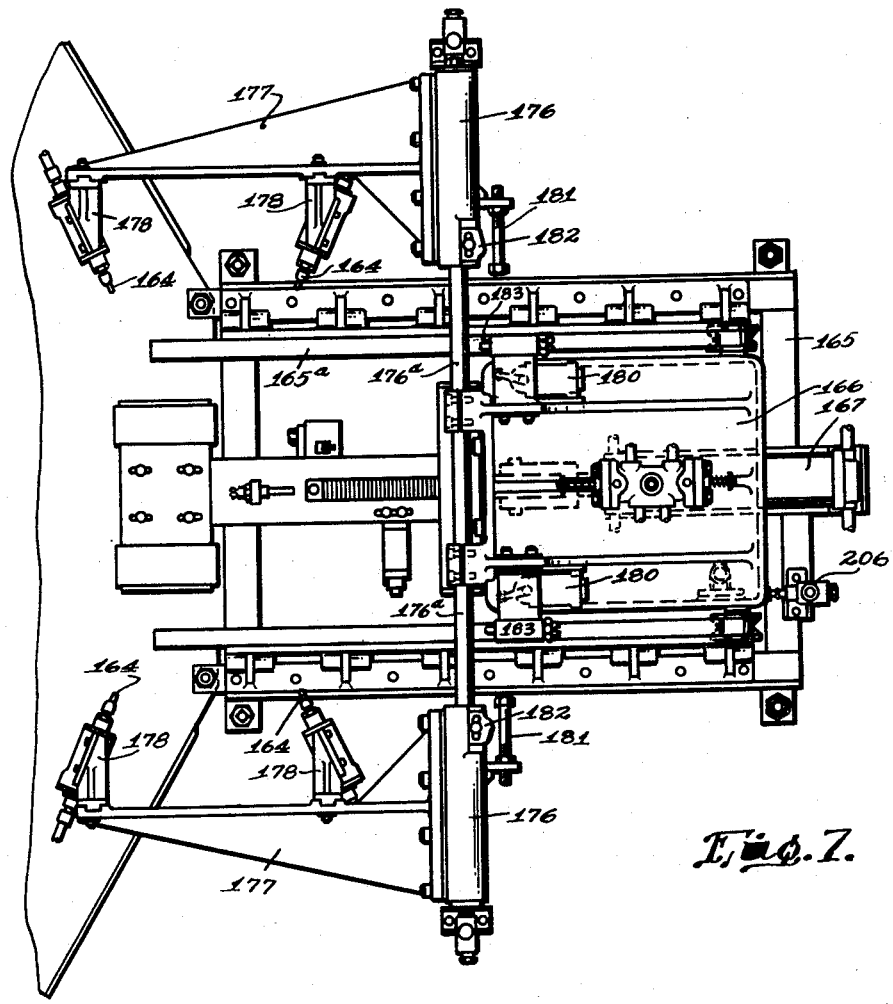

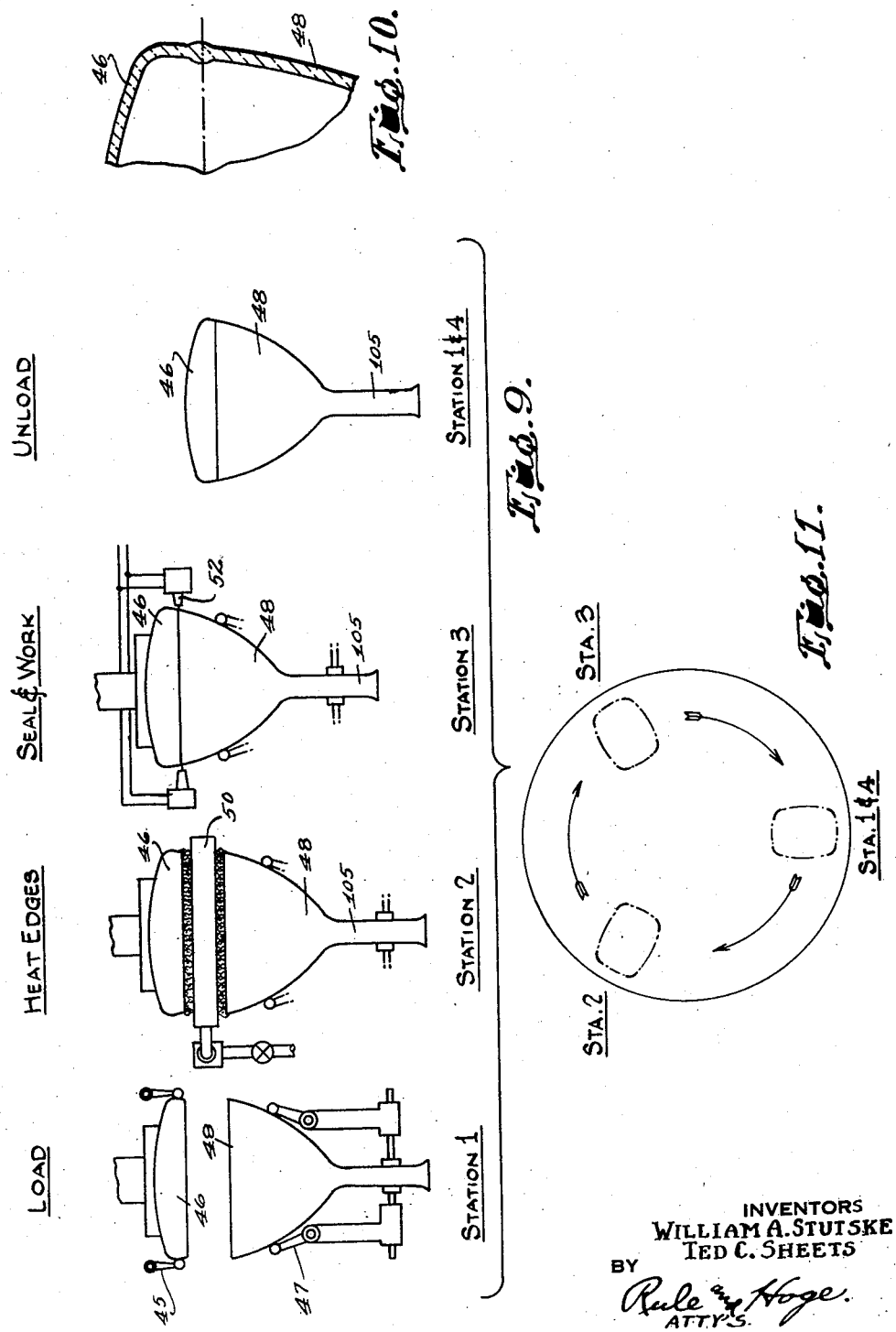

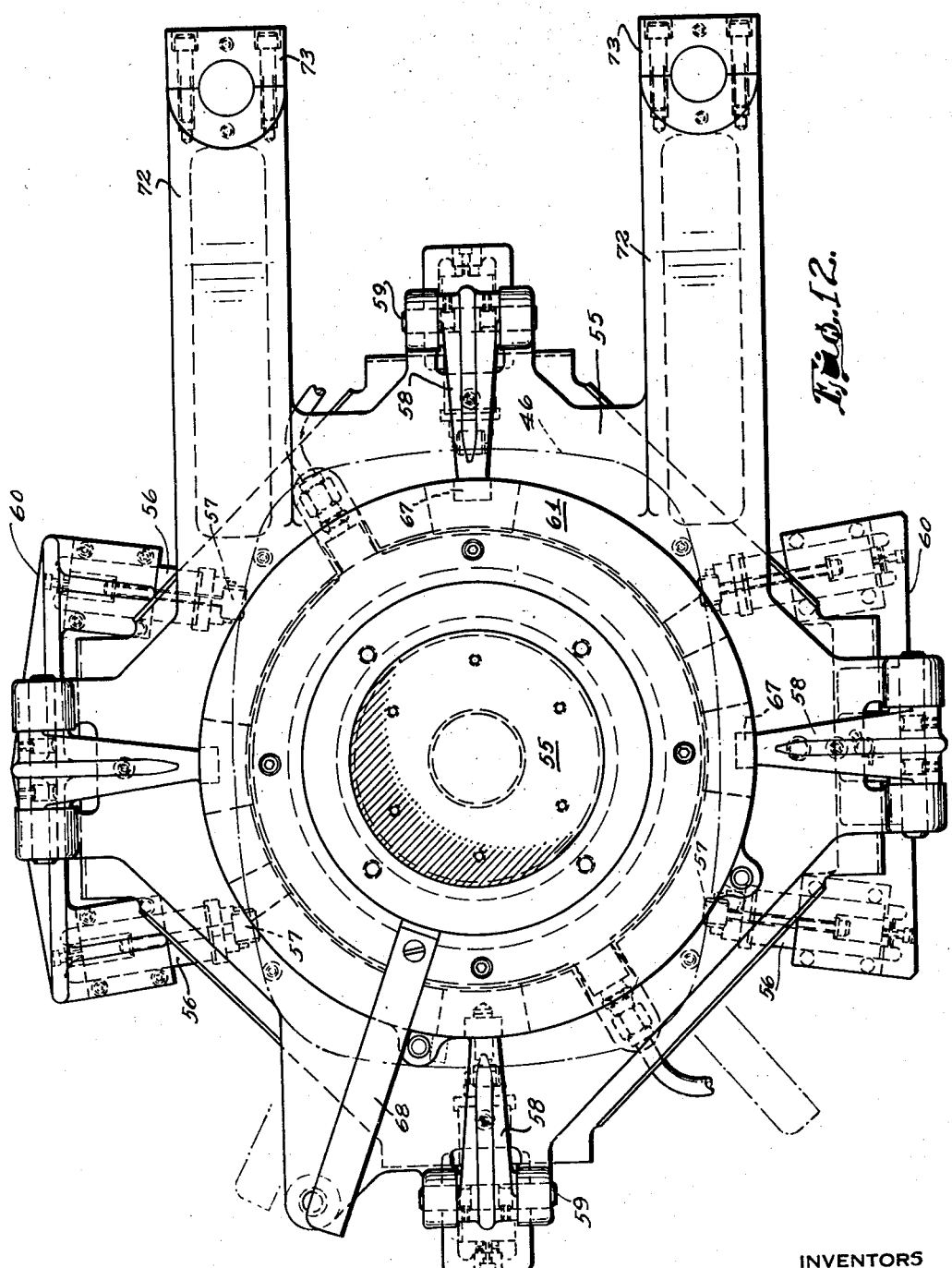

Aug. 16, 1960   W. A. STUTSKE ET AL   2,948,988
MACHINE FOR SEALING FACE PLATES TO CATHODE-RAY TUBES
Filed Aug. 22, 1956   16 Sheets-Sheet 9

INVENTORS
WILLIAM A. STUTSKE
TED C. SHEETS
BY
ATTYS.

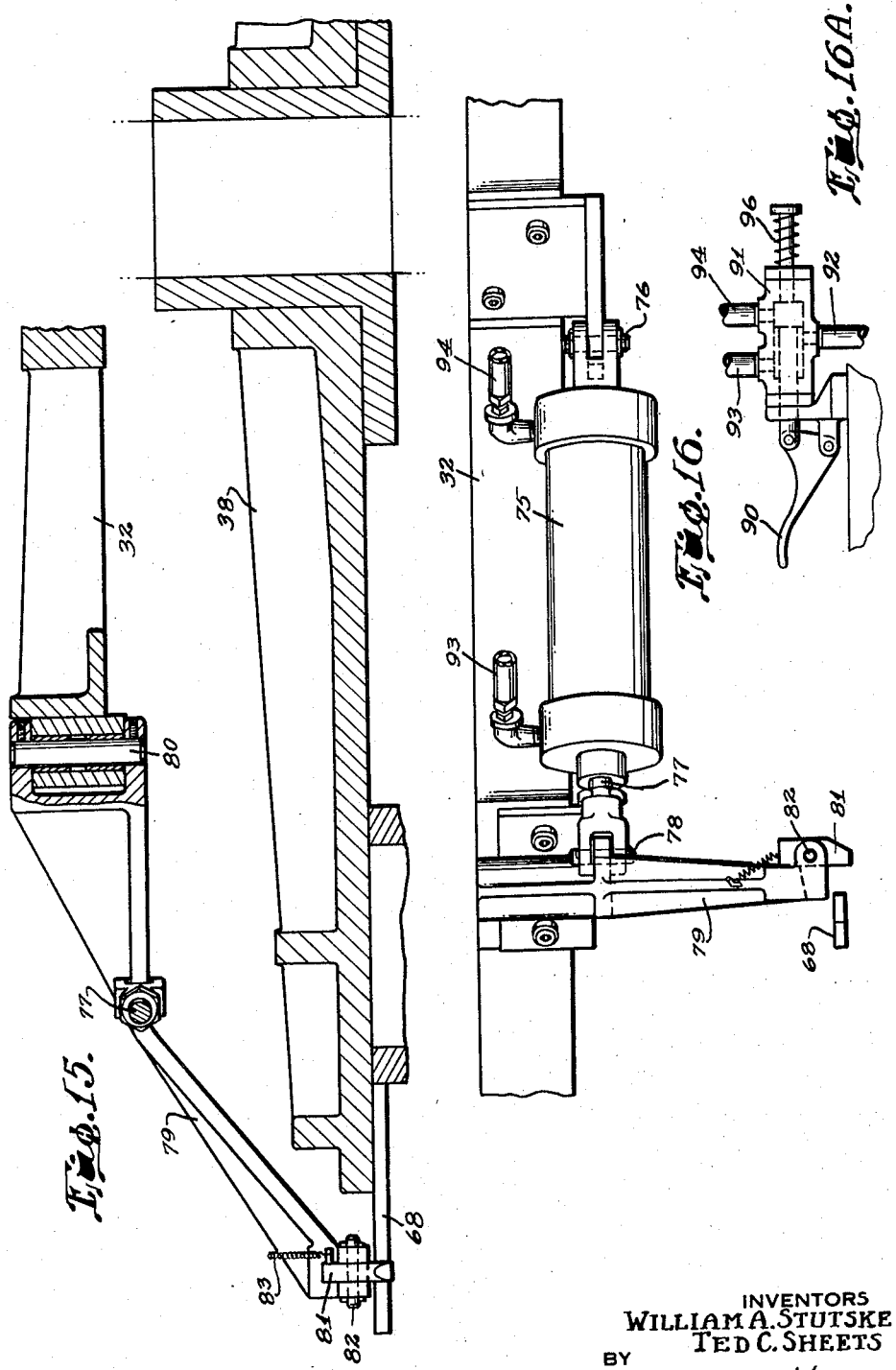

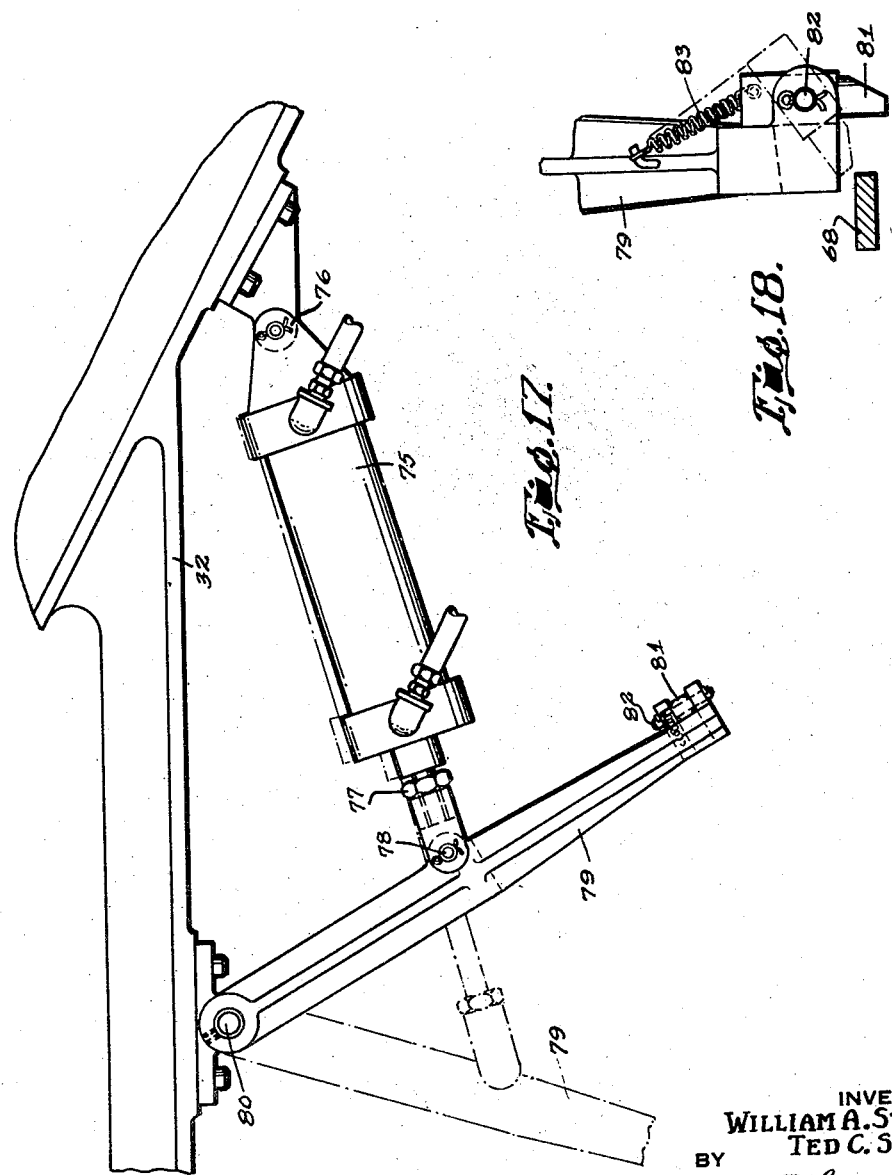

Aug. 16, 1960   W. A. STUTSKE ET AL   2,948,988
MACHINE FOR SEALING FACE PLATES TO CATHODE-RAY TUBES
Filed Aug. 22, 1956   16 Sheets-Sheet 12

WILLIAM A. STUSKE
TED C. SHEETS
INVENTORS

BY Reile and Hoge,
ATTY'S.

Aug. 16, 1960   W. A. STUTSKE ET AL   2,948,988
MACHINE FOR SEALING FACE PLATES TO CATHODE-RAY TUBES
Filed Aug. 22, 1956   16 Sheets-Sheet 15

INVENTORS
WILLIAM A. STUTSKE
TED C. SHEETS
BY
ATTORNEYS

United States Patent Office 2,948,988
Patented Aug. 16, 1960

---

2,948,988

MACHINE FOR SEALING FACE PLATES TO CATHODE-RAY TUBES

William A. Stutske and Ted C. Sheets, Toledo, Ohio, assignors to Kimble Glass Company, a corporation of Ohio Filed Aug. 22, 1956, Ser. No. 605,676

3 Claims. (Cl. 49—1)

The present invention relates to an apparatus for forming a composite glass article from a plurality of glass parts.

In the manufacture of composite glass articles, such as cathode ray tubes or the like, it is necessary to maintain a plurality of glass parts in accurate registry while securing the parts in such a manner as to provide a fluid-tight seal therebetween. To carry out the aligning and securing steps of the process, the present invention proposes the use of a preferred rotary, multistation machine which is indexed rotationally to a plurality of work stations at which the parts are sequentially aligned in separate chucks or jigs, flame-heated to an initial sealing temperature, brought into sealing contact and then heated to an elevated final sealing temperature by an electric heating current. Preferably, the sealing contact is effected during transitition from the first heating station to the second heating station, thus providing a three station machine.

The machine operation is effected under the control of a fluid-pressure actuated, timer controlled mechanism which causes step-wise, intermittent operation of the rotary machine to index the components to the consecutive stations. The welding or electric heating is carried out by actual physical contact of a plurality of electrodes with the components, the electrodes being moved into and out of such contact by automatic means operable in timed relation to the machine indexing movement.

It is, therefore, an important object of the present invention to provide an improved apparatus for forming a composite glass article.

Another important object is the provision of a machine for the assembly of glass components by the initial heating of the components, the sealing of the components to one another, and the final electric welding of the components into a composite assembly.

A further object of this invention is to provide a machine operable to transfer glass components to and from a welding station at which a plurality of electrodes physically contact the components to secure the same in sealing engagement.

Still another, and more specific, object is the provision of a machine wherein a rotatable carriage moves a plurality of superimposed components to a welding station at which a plurality of electrodes are moved radially and transversely of the machine into welding contact with the components.

Yet another object is the provision of a machine effective to index a plurality of components to and from a welding station, the machine drive mechanism including mechanism inhibiting the movement of the components from the station while the welding electrodes remain in contact with the components.

An additional object is to provide a control system for a glass welding machine, wherein the machine operation is integrated by a fluid pressure actuated, timer controlled mechanism effective to drive the machine and actuate the welding apparatus into and out of contact with the components.

Figure 13:
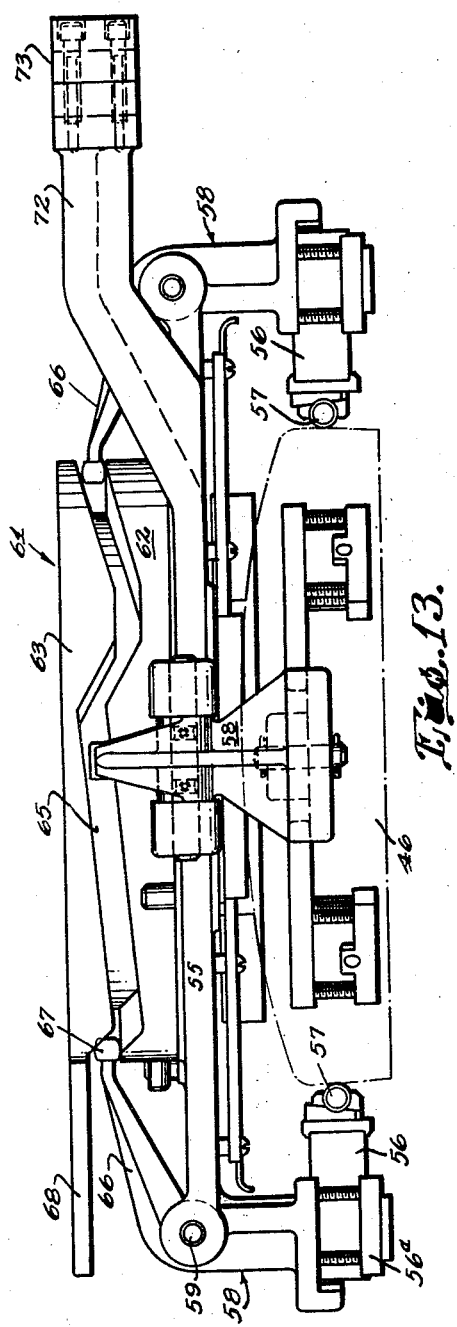
Figure 14:
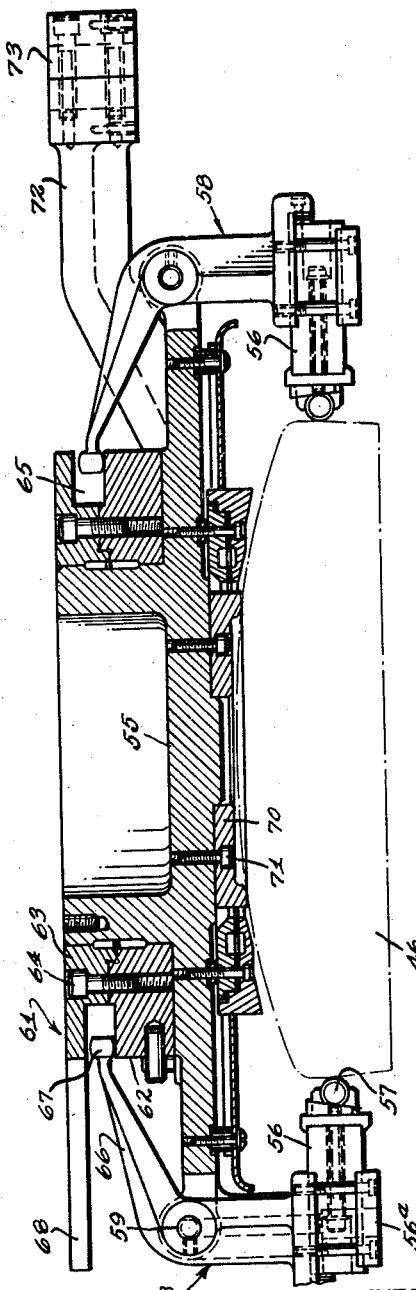
Figure 19:
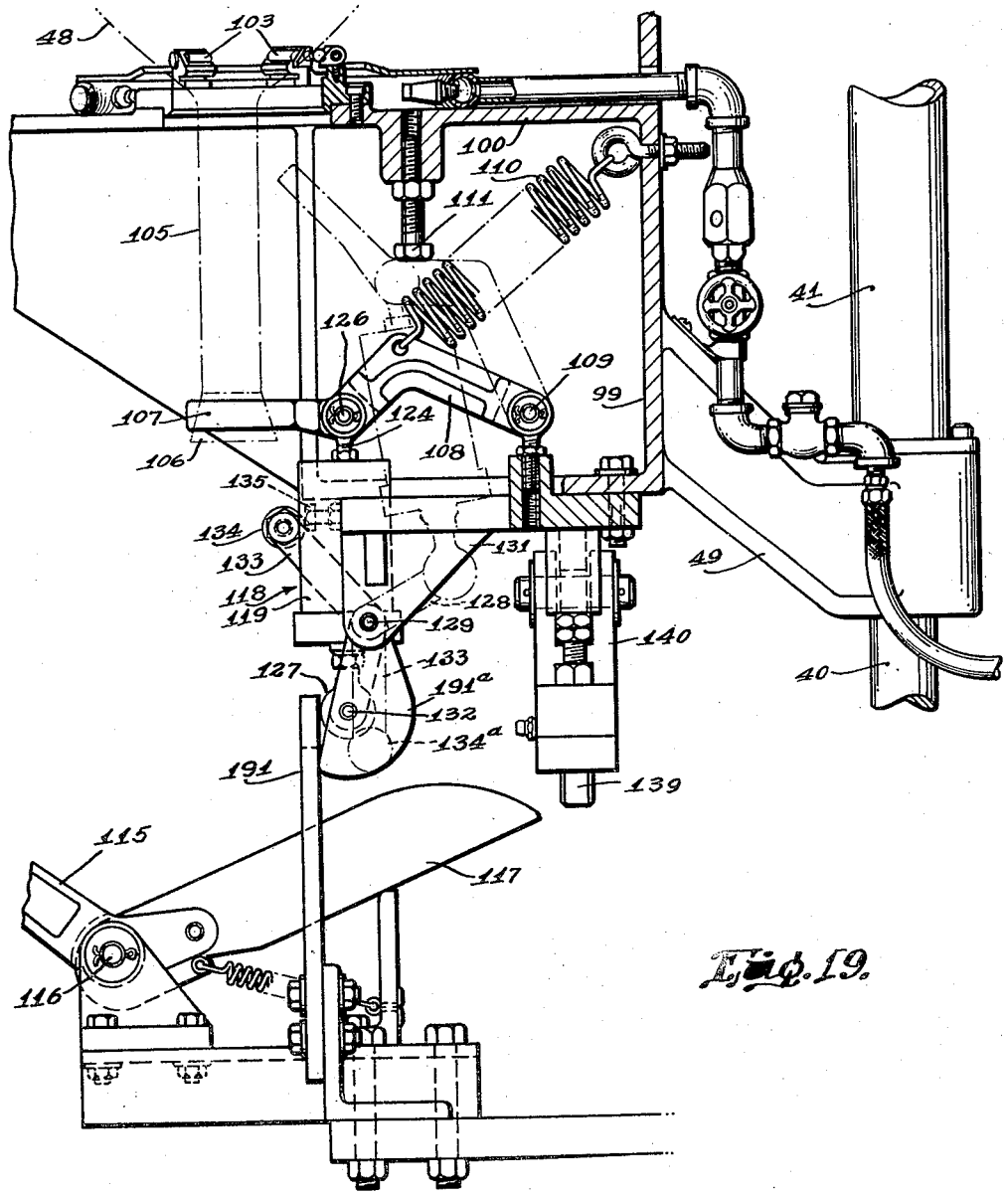
Figure 20:
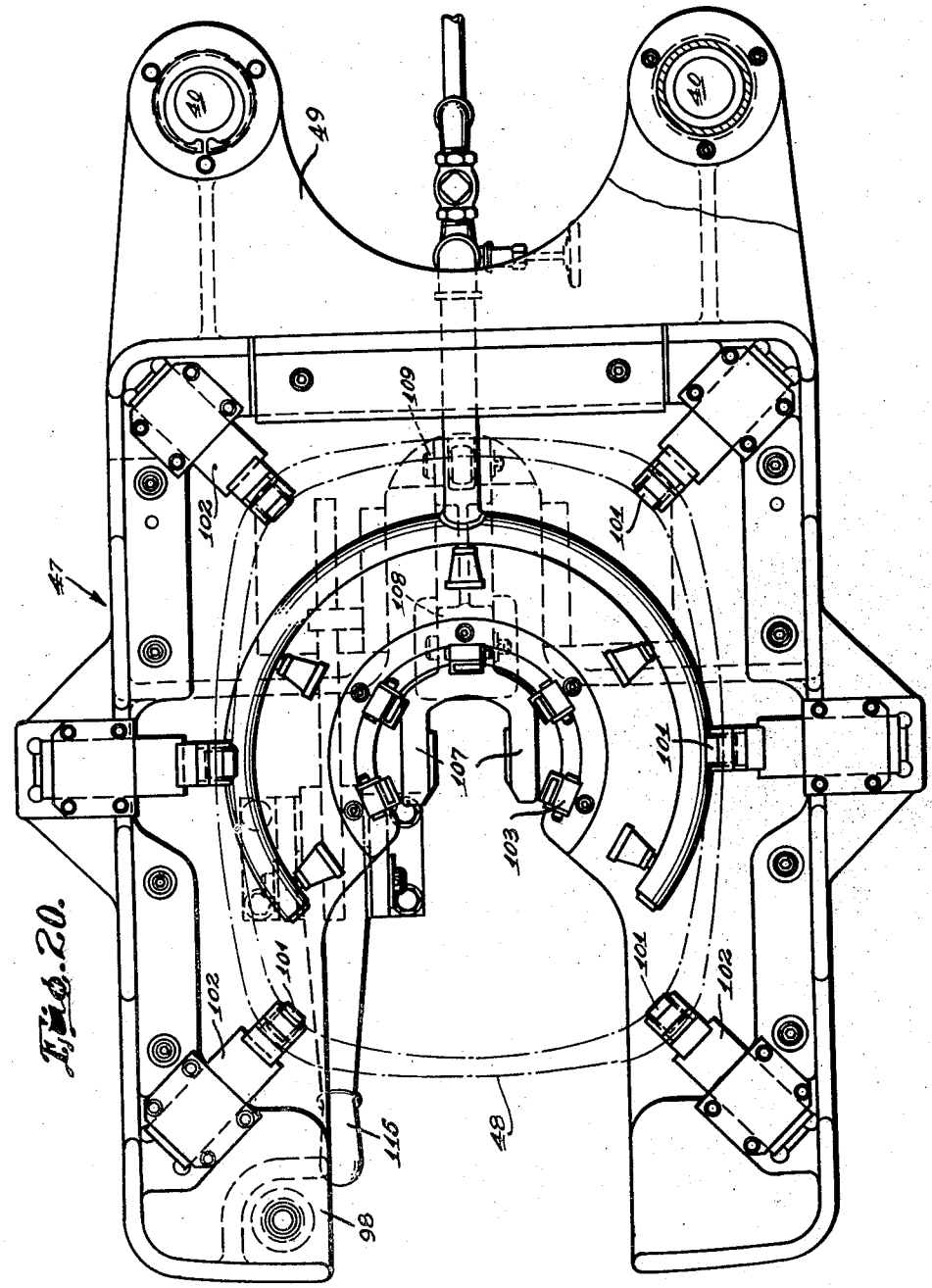
Figure 21:
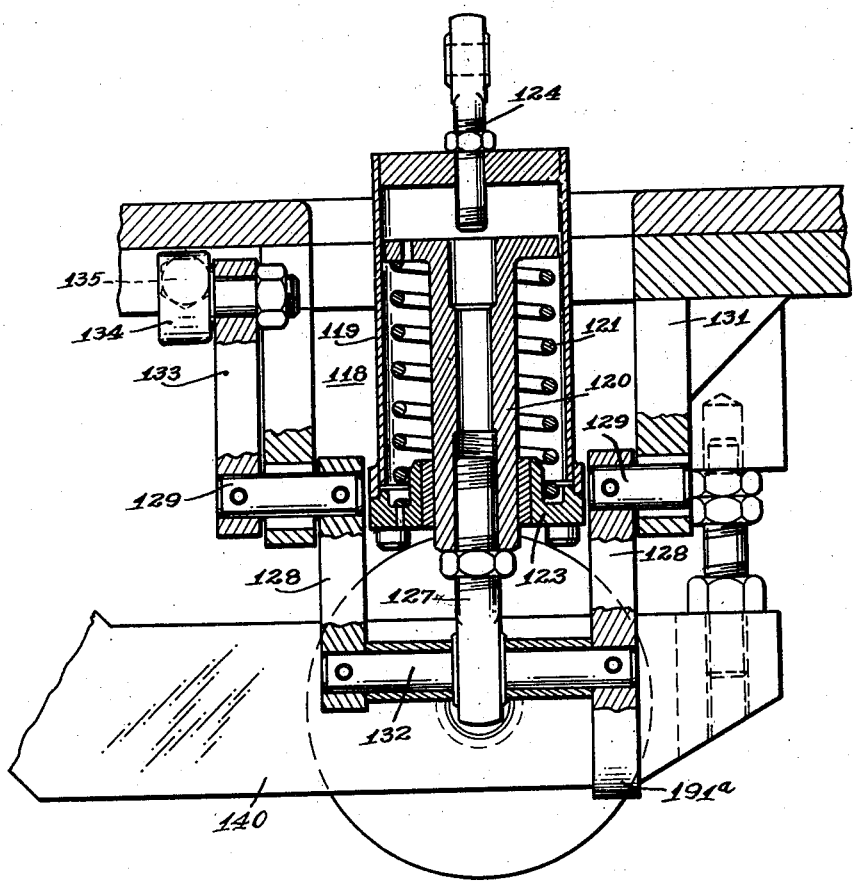
Figure 22:
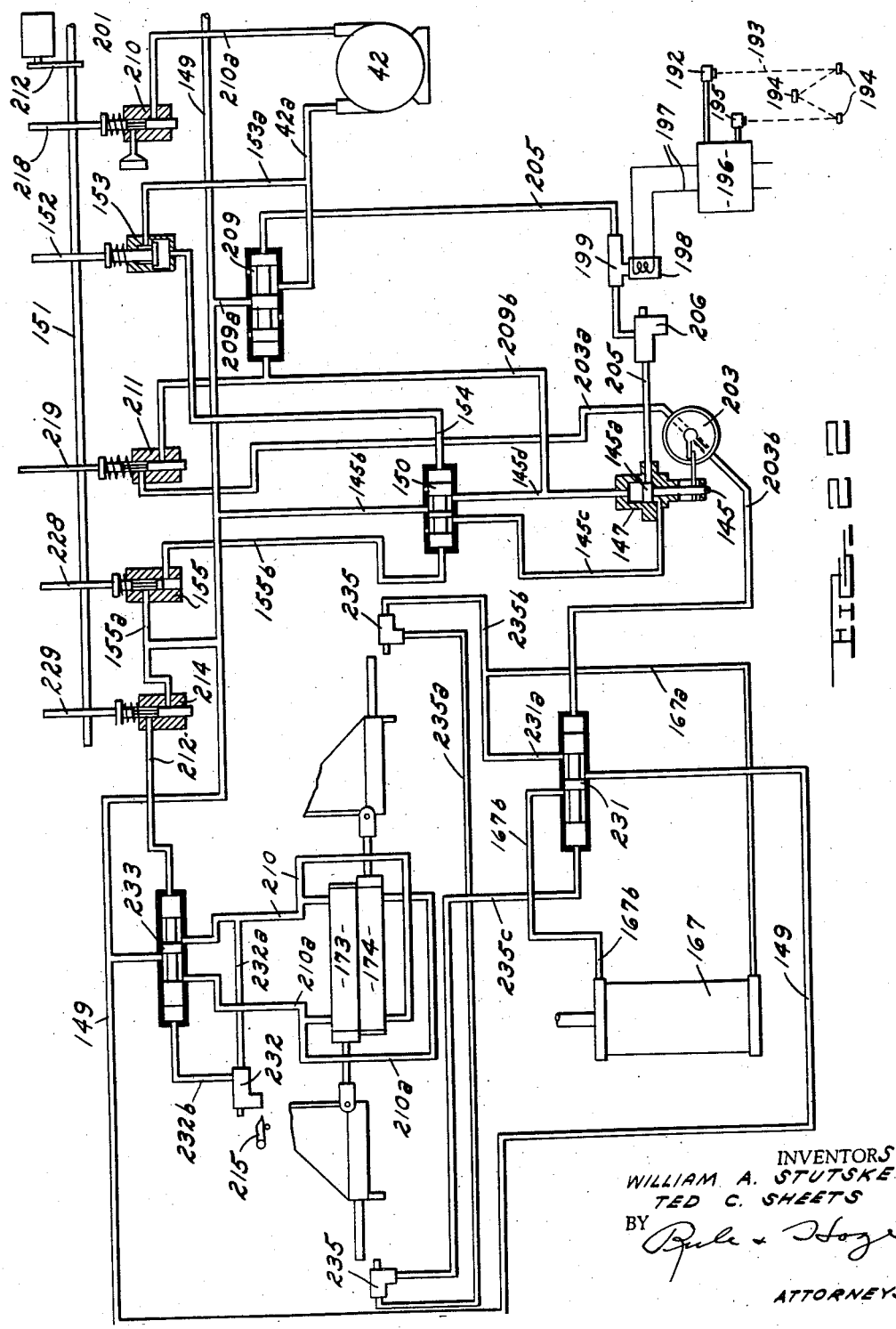
Figure 23:
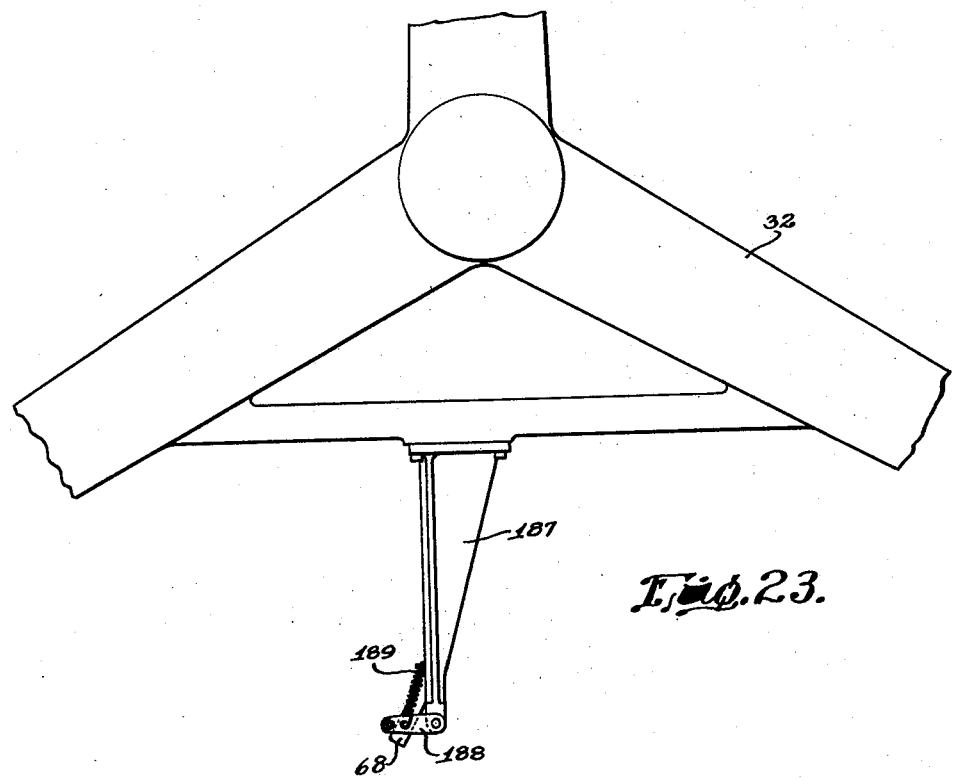
Figure 24:
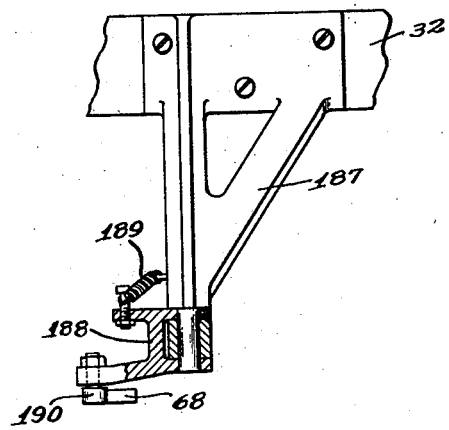

Referring to the accompanying drawings:

Figure 1 is an elevational view of the machine;
Figure 2 is a plan view of the machine;
Figure 3 is a partial sectional view taken along the plane 3—3 of Figure 2;
Figure 4 is a partial sectional view taken along the plane 4—4 of Figure 2, parts being broken away and in section;
Figure 5 is a detailed fragmentary sectional view taken along the plane 5—5 of Figure 2, showing a locating pin for restraining the carriage against rotation at its work stations;
Figure 6 is a sectional view taken along the plane 6—6 of Figure 2;
Figure 7 is a fragmentary plan view of the electrodes and the means for moving them to and from an operative position;
Figure 8 is a fragmentary elevational view of the parts shown in Figure 7;
Figure 9 is a diagrammatic view illustrating the successive steps in the assembling and sealing operations;
Figure 10 is a fragmentary detailed sectional view through the face plate and body of the tube at the sealing line;
Figure 11 is a diagrammatic view indicating the positions of a series of tubes at the several stations;
Figure 12 is a fragmentary plan view showing an upper chuck and its gripping devices for holding the face plate, and a cam for operating the gripping devices;
Figure 13 is a fragmentary view of the parts shown in Figure 12;
Figure 14 is an axial sectional view of the parts shown in Figures 12 and 13;
Figure 15 is a fragmentary sectional view illustrating a rock arm for rotating a cam which operates the gripping devices;
Figure 16 is a fragmentary elevational view of the rock arm shown in Figure 15 and an air cylinder for actuating the same;
Figure 16A shows a foot pedal controlling the operation of the air motor shown in Figure 16;
Figure 17 is a fragmentary plan view of the parts shown in Figure 16;
Figure 18 is a fragmentary detail of the dog on the arm shown in Figure 17;
Figure 19 is a partial sectional view of a cam operated means for engaging the neck of the tube and applying a downward force thereto;
Figure 20 is a plan view of the lower chuck for holding the funnel body;
Figure 21 is a sectional view of the spring loaded connector shown in Figure 19;
Figure 22 is a diagrammatic view of the control system;
Figure 23 is a fragmentary plan view showing means for releasing the face plate chuck; and
Figure 24 is a side elevation, with parts broken away and in section, of the release means in Figure 23.

General description of the machine

In the diagrammatic illustrations of Figs. 9 and 11, there is shown the general operation of the machine of the present invention and the sequence of operations carried out by the machine may be appreciated from an inspection of these views.

Generally, the machine hereinafter described is utilized in the assembly of cathode-ray tubes, namely by sealing of the face plate 46 to a funnel-neck assembly 48. This machine may be best described as a face plate-to-funnel sealing machine having a central support about which the tube components are moved peripherally to a plurality of spaced stations, including:

(1) A load and unload station at which the face plate 46 is secured to a chuck 45 and the funnel-neck 48 is secured to a chuck 47. The parts are held in axially spaced relation by the chucks at this station. Due to the rotative design of the machine, the assembled tubes preferably are returned to this same station for unloading or removal from the chucks.

(2) An edge heating or preheat station at which the mating, but spaced, free peripheral edges of the face plate 46 and the funnel-neck 48 are heated, to a sealing temperature, preferably by a stationary, gas fired burner which is interposed between the parts. After such a temperature has been attained, the parts are brought together to effect an initial seal. The sealing, preferably, is effected during the transition of the tube components from station 2 to station 3.

(3) A sealing and working station at which the initially sealed parts are heated to a much higher temperature by electric resistance heating in which a heating current is passed through the sealed surfaces to eliminate surface irregularities therebetween and to effect a final, permanent weld between the parts. After cooling, the assembled tube is removed from the machine, preferably at station 1.

*Frame and indexing structure*

Referring now to Figures 1 and 2, the framework of the machine comprises a base 30 from which rise three posts or standards 31. An upper frame member 32 is attached to the posts 31 adjacent their upper ends. The member 32 is in the form of a spider having three radial arms extending outwardly from an integral central hub 33 and braced by bars 34 extending between adjacent arms 32.

A carriage 35 on which the workholding units (hereinafter described) are supported is mounted for rotation about a vertical axis extending centrally of the posts 31. The carriage includes a central tubular vertical shaft 36, a lower plate 37 and an upper circular plate or casting 38. Vertical rods 40 extend between the lower and upper plates 37, 38, there being two such rods for each of the workholding units. Each of the rods 40 has mounted thereon telescoping sections 40$^a$, 40$^b$, and 40$^c$ which serve as dust shields to protect bearings which slide on the rods.

The carriage 35 is rotated intermittently by suitable means, preferably by an air motor 42 (Figures 1 and 6). The motor is mounted on the machine base 21 beneath a fixed platform 42$^a$ carried on vertical standards 42$^b$, Figure 1. The motor 42 operates through speed reduction gearing in a gear box 43 and under the control of a timer to rotate the carriage intermittently, each rotative step being 120° in extent. In this manner, each of the three workholding units is sequentially brought to and stopped at each of the three stations 1, 2, and 3, heretofore described.

Carried by the stationary platform 42$^a$ and concentric with the carriage shaft 36 is a circular cam plate 138 having a free upper cam surface 138$^a$ (Figures 1 and 6) for effecting relative vertical movement of the chucks in a manner to be hereinafter described in greater detail.

Thus, it will be appreciated that operation of the motor 42 will effect rotation of the shaft 36 to cause each of the three pairs of rods 40 to traverse each of the three stations heretofore described.

*Face plate and funnel-neck chucks*

The tube components are retained in position for assembly by a pair of vertically aligned chucks carried by the rods 40 and now described in detail.

The carriage has mounted thereon three chucks in which the work-pieces are disposed for rotation with the carriage. The units are of like construction and only one chuck need be described in detail. Each unit comprises an upper chuck or face plate holder, indicated generally at 45, for gripping a face plate 46 and holding it during the sealing operation. The unit also comprises a lower chuck holder, generally indicated by numeral 47, for holding the funnel-stem assembly or body 48. The lower chuck 47 is carried by pairs of upper and lower arms 49 on bearing sleeves 41 slidably journaled on the guide rods 40 and by which the chuck is mounted for up-and-down movement. The motor 42 operates under the control of a timer (hereinafter described) to rotate the carriage intermittently through 120° for each transition from one station to another.

Referring to Figures 6, and 12 to 14, each upper chuck comprises a supporting plate 55 on which are mounted a plurality of gripping devices or jaws 56 each including a contact element 57 which bears against the marginal portion of the face plate 46. As shown in Figure 12 the face plate 46 is approximately rectangular, being referred to as a rectangular face plate, and is held by six jaws 56 including two on each of the longer sides of the face plate and one at each end. The jaws at the end of the face plate are carried on bell cranks 58 connected by pivots 59 to the plate 55. The pairs of gripping devices or jaws at the sides of the face plate are carried on bell cranks 60 also pivoted to the plate 55. The jaws 56 are adjustable lengthwise and held in adjusted position by clamping bars 56$^a$.

The gripping devices or jaws are moved to and from gripping position by an annular cam, indicated generally at 61, and mounted on the plate 55 for rotative movement about the vertical axis of the plate. The cam comprises a lower cam plate 62 and an upper cam plate 63 removably attached to the lower plate, as by bolts 64. The cam plates are shaped to define therebetween a peripheral cam groove 65. Each of the bell cranks 58, and 60 includes an inwardly extending arm 66 with a terminal cam follower roll 67 entered in the cam groove 65. The upper cam plate 63 is provided with a radially extending arm 68 by which the cam is rotated, as hereinafter described, for actuating the gripping devices 56. The face plate 46 is placed in the machine manually at station 1 with the upper surface of the face plate bearing against a contact ring 70 attached by bolts 71 to the under surface of the plate 55.

The chuck 45 is mounted on the rods 40 by a pair of arms 72 integral with the plate 55. The arms are formed at their outer ends with split bearing rings 73 by which they are clamped to the rods 40.

The means for rotating the cam 65 and thereby operating the gripping devices 56 will be understood by references to Figures 15 to 18. Such means includes an air operated piston motor 75 pivotally connected, as at 76, to the spider 32. The motor piston rod 77 is connected, as at 78, to an arm 79, which is journaled by a vertical pivot 80 to the spider 32 for horizontal swinging movement. The arm 79 is downwardly and outwardly inclined and at its outer lower end carries a dog 81 on a pivot pin 82. The dog is held in upright position by a spring 83.

When the motor piston rod 77 is extended, it swings the arm 79 about its pivot from its full line to its broken line position (Figure 17). During this movement the dog 81 engages the arm 68 and rotates the cam 61. The cam track is formed with inclined portions, as shown in Figure 13, which operates during such rotation of the cam to swing the bell crank 66 upwardly, so that the jaws 56 grip the face plate and hold it against the bearing ring 70. When the motor 75 is operated (as presently described) to return the arm 79, the face plate remains gripped in the chuck. During such return movement of the arm 79 the dog 81 (Figure 18) swings about its pivot as it passes the arm 68.

The operation of the motor 75 is controlled manually by means of a foot pedal 90 (Figure 16A) which operates a control valve 91. Air pressure is supplied through a pipe 92. When the foot pedal is free (i.e. in its upper position), the pressure in a supply line 92 communicates through the valve with a line 93 extending to the left-hand end of the air cylinder 75, so that the piston is held in its retracted position. When the foot pedal is depressed the line 93 is shut off and the pressure line is connected through the valve to a line 94 extending to the right-hand end of the cylinder 75, thereby swinging the arm 79 and clamping the chuck to the face plate as above described. When the foot pedal is released, a return spring 96 urges the valve to its illustrated position, so that the operating arm 79 is retracted leaving the face plate clamped in the holding chuck. The chuck is released as hereinafter described by the indexing movement of the carriage.

The lower chuck 47 in which the funnel body 48 is supported and the means for operating the chuck as shown in Figures 6, 19, and 20 will now be described. The chuck is mounted for up-and-down movement within a surrounding shield 97 on the carriage. The chuck includes an upper plate 98 mounted on a casing 99, the latter having an integral horizontal partition 100 intermediate at its upper and lower ends. The rim of the funnel body 48 is approximately rectangular in outline (as shown in Figure 20) to conform to the shape of the face plate 46.

The funnel is supported on contact rolls 101 on electrically insulated arms 102 mounted in the upper end portion of the chuck. The rolls 101 engage the exterior surface of the funnel a short distance below the rim thereof. Graphiter contact rolls 103 mounted on the partition plate 100 engage a circular portion of the funnel body adjacent its lower end, for centering it and for forming additional support. A stem 105 integral with the funnel body and extending downwardly therefrom is formed with a downwardly flared end portion 106.

The means for holding the funnel body 48 in the chuck includes a fork 107 which straddles the flared end 106 of the stem 105. The fork is formed on the outer or free end of the rock arm 108 mounted to swing about a terminal pivot 109. A coiled tension spring 110 (Figure 19) anchored to the casing 99 normally holds the arm 108 in its upper position, as shown in broken lines in Figure 19, with the arm in contact with an adjustable stop screw 111. When the arm 108 is drawn downwardly (as will be presently described), the fork 107 engages the flared end 106 of the stem 105 and applies a yielding downward pull to said stem to hold the funnel body 48 firmly in the chuck.

The mechanism for drawing the arm 108 downwardly as shown in Figures 6, and 19 to 21 includes an elongated hand lever 115 pivoted at 116 to the platform 42ᵃ and to a rock arm 117. The arm 117 operates through a linkage to actuate the forked arm 108. Such linkage includes a link assembly 118 which, as shown in Figure 21, comprises a cylindrical shell or casing 119 enclosing a tubular shaft 120 movable lengthwise (i.e. vertically) of the shell 119. A coiled compression spring 121 within the shell 119 bears at its upper end against the flanged end of the shaft 120 and at its lower end seats on the end plate 123 of the shell. A threaded eye bolt 124, adjustable in the upper end plate 125 of the shell, is connected, as at 126 (Figure 19), to the rock arm 108.

An extension 127 of the shaft 120 is connected to a crank portion 132 for moving the eye bolt 124 and the arm 108 downwardly. A pair of rock arms 128, secured to the crank portion 132, are connected at their upper ends to aligned pivot pins 129 journaled in a pair of depending brackets 131 fixed to the casing 99. The extension, 127 is journaled on the crank 132 for actuation by the rock arms 128 and an additional rock arm 133 secured to one of the pivot pins 129, the rock arm 133 carrying at its free end a roll 134 in the path of movement of the arm 117.

When the hand lever 115 is swung downwardly about its pivot, the cam arm 117 is raised to engage the roll 134 (which at this time is in its lowered position 134ᵃ), thus swinging the arm 133 in a clockwise direction. The crank thus swings the arms 128 downwardly to draw the connector 118 downwardly from the broken line position to its full line position (Figure 19). During this movement, the shaft 120 compresses the spring 121 so that, when the shaft 132 is carried to the left of the pivot 129 (namely, past the dead center in which the pivots 132, 129, and 126 are in line), the final movement of the connector 118 is effected by the spring 121 which has been compressed while being drawn downward. The movement is arrested by abutment of the roll 134 with an adjustable stop screw 135.

This operation brings the fork 107 into engagement with the flared end 106 of the stem and holds the funnel with a yielding downward pressure supplied by the spring 121.

The clamping arm 108 is automatically released, as the chuck approaches the unloading station, by a stationary cam 191 positioned in the path of the arm 191ᵃ forming an extension of one of the crank arms 128 and operative to swing with the arm 133 counter-clockwise about the axis of the pivot pins 129. This carries the link 118 past the dead center, permitting the clamping arm 108 to be lifted by the spring 110.

During indexing movement, the chuck 47 is guided by the sleeves 41 for vertical movement by the stationary circular cam 138 on which runs a cam follower roll 139. This roll is journaled in an adjustable arm 140 depending from the bottom of the chuck casing 99.

Flame heating apparatus

As best illustrated in Figure 4, the face plate 46 and the funnel-neck 48 are moved peripherally to a flame heating station after having been assembled in the chucks 45 and 47, respectively.

The flame heating apparatus comprises a burner 50 positioned in the path of rotative movement of the components and of a vertical size such as to be received between the axially separated components. The burner 50 is supported upon a stationary stand 143 having a radial swinging arm 144 connected to the burner. A second alternately usable, burner 142 is supported on a similar arm 144 for use when the burner 50 becomes clogged or otherwise unusuable.

The burner 50 serves to heat the component edges to a welding or adhering temperature. After such a temperature has been attained, the next peripheral indexing of the shaft 36 serves to jam the components into abutment by elevation of the lower chuck 47, by virtue of rolling engagement of the cam follower 139 with an elevated portion of the cam 138. The resulting contact of the components will initially seal the face plate 46 to the funnel-neck 48. After such initial contact, the components are retained in contact and in condition for final sealing.

Proper alignment between the components during this initial seal and subsequent final sealing is promoted by a guide pin 160 (Figure 6), cammed upwardly by a cam surface 160ᵃ (Figure 3) on the shield 97, into a notch 161 (Figure 2) on the face plate chuck 45.

Electric welding apparatus

Although an initial seal is effected by peripheral contact of the face plate and funnel-neck edges after flame heating, sealing imperfection, such as surface bubbles, irregularities in the sealing edges, etc., may exist to prevent the formation of a perfect seal. To obviate such a possibility, the sealed edges are reheated to a higher or welding temperature by electric resistance heating means to be presently described. This apparatus, which is positioned at station 3 heretofore described, comprises the following structure:

The welding mechanism, shown in Figures 2, 3, 7, and 8, includes electrodes 164 which are brought into contact with the welded tube at the line of the weld for completing the welding operation by electrical resistance heating. The welding mechanism is mounted on a stationary frame 165 (Figure 3) at one side of the main frame of the machine.

A main or radial carriage 166 for the electrodes is mounted for reciprocating movement on the frame 165 and radially of the center shaft 36 of the machine. Rollers 166a on the carriage 166 run on guide rails 165a on the frame 165 (Figure 8) to guide such movement. The carriage 166 is driven by a cylinder 167 mounted on the frame 165 and having a piston rod 168 connected at its forward end to a crosshead 169 in which is journaled a pinion 170. The pinion 170 meshes with a fixed rack 171 on the frame 165 and a movable rack 172 carried by the carriage 166. Reciprocation of the rod 168, upon actuation of the cylinder 167, will reciprocate the radial carriage 166 to an extent greater than the extent of actuation of the rod, since the gear set composed of the racks 171 and 172 and the pinion 170 interposed therebetween is inherently an overdrive mechanism.

Mounted in the carriage are additional fluid pressure motors comprising upper and lower cylinders 173 and 174 (Figures 3 and 8), extending transversely of the carriage. The piston rods 175 of the motors are connected to transverse slides 176 to which are secured forwardly extending arms 177. The slides 176 are guided by rods 176a affixed to the carriage 166. The electrodes 164 are mounted in holders 178 at the forward ends of the arms 177, the electrodes being mounted in pairs on the respective arms.

When the partially or initially sealed tube is indexed to the welding station, the motor 167 operates to move the carriage 166 forward. The motors 173 and 174 then operate to move the arms 177 inwardly, thereby bringing the electrodes 164 into contact with the tube at the plane of juncture between the face place and the funnel-neck. Switches 180 are operated to connect the electrodes 164 with a source of electric current supply as the electrodes approach the workpiece. The means for actuating the switches 180 include trips 181 adjustably mounted on the slides 176. The trips 181 actuate the switches 180 when the electrodes reach or are in close proximity to the welded surface. Alternating current may be supplied through the switches 180. The means for controlling the electric current supply to the electrodes may be the same as that disclosed in the patent to Young 2,680,332, June 8, 1954, Welding Glass Parts. The electric current may be supplied to the electrodes in succession, as disclosed in the Young patent, and such current serves to insure a perfect weld.

After the weld is completed the piston motors 173, 174 operate to withdraw transversely the electrodes. During the initial withdrawing movement of the electrodes, the glass adhering to the electrode is drawn out in the form of thread, preferably before the current is cut off. The movement of the electrodes is momentarily arrested when they are a short distance from the glass to permit the attached threads of glass to be melted off and the glass smoothed by a final arc. The means for arresting the electrodes comprise cams 182 on the slides 176. The cams are brought into contact with spring loaded detents 183 which apply a sufficient retarding force to momentarily arrest outward movement of the electrodes.

After transverse withdrawal of the electrodes is complete, the radial cylinder 167 is energized to retract the electrode carriage 166, in a manner to be later described in detail.

Tube release apparatus

After the welding operation, the carriage remains at rest during a cooling period and then the carriage is indexed to bring the welded tube to station 1 for unloading. The cam track 138 is shaped to maintain the relative position of the upper and lower chucks during the initial portion of the indexing movement, for example, 15 degrees of rotation. During the movement through this arc, the cam 61 on the face plate chuck is operated to withdraw the gripping jaws 56 and free the face plate.

The means for effecting this operation, as shown in Figures 23, 24 comprises a radially disposed arm 187 on the upper frame member 32. A finger 188 pivoted to the arm 187 is held in operative position by a spring 189. A roll 190 on the outer end of the finger 188 is positioned in the path of the arm 68 on the cam 61 (Figures 12 and 13). Continued rotation of the carriage after the arm 68 contacts the roll 190, rotates the cam 61 in the direction to release the holding jaws 56. Further rotation of the carriage causes the rock arm 188 to be swung outwardly past the end of the arm 68, thus releasing the cam for the next chucking operation.

As soon as the face plate is released as just described, the funnel chuck 47 with the welded tube thereon is lowered. Before the loading station is reached the clamping arm 108 (Figure 19) is released by the fixed cam 191, thus leaving the tube 48 free and resting on the chuck ready for unloading at the loading and unloading station.

Control system

The apparatus of the present invention is operated under the control of a fluid pressure control system best illustrated in Figure 22;

The source of power for the system is a source or main pressure line 149 which receives fluid pressure from a suitable source, such as a pneumatic compressor or the like. It will be appreciated that a hydraulic control system may be utilized for the same purpose as that herein described and that the same principles of control operation will obtain.

The primary control mechanism comprises a timing shaft 151 driven by suitable means, as by a timer motor 201, through a change speed mechanism, such as a belt and sheave unit 212, so that the shaft 151 will revolve three times for each complete revolution of the main machine shaft 36. Since the machine is a three station unit, each control operation must be carried out three times for each machine revolution, thus the 3-to-1 ratio of shaft 151 to shaft 36.

The prime motive power for the machine is the air motor 42 which drives the machine shaft 36. Since there is a direct mechanical connection between the motor 42 and the shaft 36, as through gearing 43, the motor 42 is run only to index the shaft between stations.

This intermittent motor operation is primarily under the control of a shuttle valve 209, interposed between the motor and the source line 149. Also, the motor operation is controlled by a motor exhaust valve 210 adapted to be actuated by a cam 218 on the timer shaft 151.

To retain the machine in its indexed station positions, a locking pin 145 is provided, as shown in Figure 5, for entry in one of a series of locking recesses 146 formed on the upper carriage plate 38. The pin 145 is fixed against rotation, while the plate 38 rotates with the machine main carriage to bring one of the recesses 146 into alignment with the pin 145 when each work station is attained.

The control system also operates the electrode carriage cylinder 167 to radially advance or retract the welding electrodes 164, and the cylinders 173 and 174 must be actuated to effect contact of the electrodes 164 with the sealed components.

Thus, the operation of the motor, as effected by the shuttle valve 209 and the exhaust valve 210, is influenced by the operation of the locking pin 145, the electrode radial carriage cylinder 167, and the electrode transverse cylinders 173 and 174, all under the timing control of the shaft 151.

To best comprehend the operation of this control system, the cyclic operation of the machine is as follows:

Let us assume that a welding operation has just been completed and the machine is to be indexed to the next station.

Prior to the actuation of the motor 42, the valve 209 is in its illustrated rightward position, the index pin 145 is in its illustrated locking position, the cylinder 167 is extended, and the cylinders 173 and 174 are in their inward positions at which the electrodes are in welding contact with the glass components.

The first operation necessary is the removal of the electrodes from the glass components. This is accomplished by timed actuation of an electrode carriage reversing valve 214 by a cam 229 on the shaft 151. Opening of the valve 214 will introduce fluid under pressure through line 212 into the right side of the shuttle valve 233, moving the valve so that pressure from the source 149 can enter the cylinders 173 and 174 through lines 210 to extend the cylinders laterally. The lateral extension of the cylinders will be slowed at an intermediate position by the action of the cams 182 and detents 183 as earlier explained.

When the transverse extension of the cylinders 173 and 174 is substantially complete, so that the electrodes completely clear the components 46 and 48, the carriages 176 abut a pair of limit valves 235 to open the same. These limit valves 235 are interconnected through a line 235$^a$ and are connected through line 235$^b$ to the extension pressure supply line 167$^a$ for the radial carriage cylinder 167. The valves 235 then complete a circuit to the shuttle valve 231 through line 235$^c$. When the carriages 176 are extended laterally so as to clear the components 46, 48, the valves 235 are opened to vent pressure from line 167$^a$ through lines 235$^b$, 235$^a$, and 235$^c$ to the left side of shuttle valve 231. The resultant movement of valve 231 vents the upper or retraction end of the cylinder 167 to line 149 through line 167$^b$ and the main or radial carriage 166 is retracted.

The locking pin must be removed, and this action is accomplished simultaneously with, or even prior to the retraction of the electrodes, by actuating the pin release valve 155 by a cam 228 on the timing shaft 151. Opening the valve 155 will connect the left end of the pin control shuttle valve 150 to the supply line 149 through line 155$^a$ and 155$^b$, causing the valve 150 to move to the right, so as to connect the undersurface of the pin piston 145$^a$ to the line 149 through lines 145$^b$ and 145$^c$. The locking pin is thus elevated from its recess 146 and the machine carriage is free to index.

Movement of the pin valve 150 removes any thrust to the right on the motor shuttle valve 209 and, through the interlock timing valve 211 and the interlock valve 203, any thrust to the left on the carriage cylinder shuttle valve 231 is removed.

Now that the pin 145 has retracted, the motor 42 can be energized by shifting the shuttle valve 209 to the left to establish communication between the motor and the source line 149. Also, the motor exhaust is opened by actuation of valve 210 by its timer cam 218.

To move the motor valve 209, pressure from the line 145$^c$ passes under the pin piston 145$^a$ and through line 205 to the electrode carriage limit valve 206, which if not already opened by retraction of the radial carriage 166 (Figure 7) overrides the previously actuated timers, and thence through line 205 to a safety control valve 199. This valve 199 is solenoid controlled, as by solenoid 198 which is energized through electric lead wires 197 from an amplifier 196. The amplifier 196 receives a signal from a light source 192 and reflected from mirrors 194 (as in path 193) to a photoelectric cell 195. The source 192, mirrors 194 and cell 195 are located at the load-unload station and, if the path 193 is interrupted by a workman installing or removing components from the chucks 45 and 47, the motor 42 cannot be energized, since line 205 will be blocked by valve 199.

When the exhaust valve 210 is open, and the shuttle valve 209 is moved to the left, the motor receives pressure fluid through the lines 209$^a$ and 42$^a$ and exhausts through line 210$^a$. Thus, the machine is indexed 120° by the motor 42, the extent of movement being controlled as follows:

As the next successive components 46 and 48 approach the welding station, the exhaust valve 210 is closed to throttle the motor and to reduce the indexing speed. Fluid pressure is still present in the line 42$^a$, such pressure being vented through line 153$^a$ to a locking pin actuation valve 153. When the valve 153 is opened, through the agency of its cam 152 on shaft 151, pressure fluid is passed through line 154 to the right hand end of shuttle valve 150 to urge the same leftward to its illustrated position. Thus, the valve 150 connects line 145$^b$ to line 145$^d$ to urge the valve piston 145$^a$ downwardly and to insert the locking pin in the recess 146 corresponding to the desired position of the machine carriage. Movement of piston 145$^a$ is accommodated by venting of line 155$^b$ through the valve 155 to atmosphere.

Simultaneously with depression of the pin 145, the line 209$^b$ receives fluid under pressure to move the shuttle valve 209 to the right, thus cutting off the supply of fluid to the motor 42.

Also, movement of the pin 145 establishes communication through interlock valve 203 between lines 203$^a$ from the interlock cam valve 211, which has been opened by its cam 219, to vent line 203$^a$ to line 209$^b$, and the line 203$^b$ which urges the electrode carriage radial shuttle valve 231 to the left, so that the carriage is urged radially inwardly through pressure from line 149 and valve 231 to lines 231$^a$ and 167$^a$. The radial inward movement of carriage 166 will actuate limit valve 232 through a pawl 215 on the carriage, so that pressure from line 149 through valve 233 and line 210$^a$ will pass through lines 232$^a$ and 232$^b$ to the left side of shuttle valve 233, moving the valve 233 to the right. Then pressure through the valve 233 and lines 210$^a$ will be vented to the inner ends of cylinders 173 and 174. The previous closing movement of valve 214 will vent line 212 to atmosphere to accommodate such movement.

The carriage 166 will thus advance radially and the electrode carriers 176 will be moved inwardly to accomplish the necessary welding operation.

Thus, the full operative cycle of the machine has been completed by one full revolution of the timer or cam shaft 151 and 120° of rotation of the shaft 36. This cycle will be completed three times for each complete revolution of the shaft 36.

This application is a continuation-in-part of our earlier application Serial No. 498,578, filed April 1, 1955, now abandoned.

Modifications may be resorted to within the spirit and scope of our invention as defined in the following claims.

We claim:

1. In an apparatus for forming a composite glass article from a plurality of glass parts, a parts carriage adapted to be indexed rotationally for conveying juxtaposed parts to and from a welding station, a radial electrode carriage linearly movable radially of said parts carriage and a transverse electrode carriage movable transversely of the parts carriage, electrodes carried by one of said electrode carriage for contact with said parts at said station, actuatable power means for indexing said parts carriage, separately actuatable power means for said radial carriage and said transverse carriage, respectively, and means interposed in the path of movement of said transverse carriage for preventing movement of said radial carriage until said transverse carriage has been actuated and means interposed in the path of movement of the radial carriage to prevent movement of the parts carriage from the station until said electrodes are entirely removed from contact with said parts.

2. In a welding apparatus for forming a composite glass article having motor means, a rotatable carriage driven by said motor means, and chucks on said carriage for conveying juxtaposed glass parts to a plurality of work stations; means controlling the operation of said motor means for operating the same intermittently to convey the parts between stations and for accommodating the momentary retention of said parts at said stations for an electrode welding operation, comprising timer means, a source of fluid pressure, a shiftable motor control valve, a fluid pressure actuated stop element, means responsive to said timer means to actuate said stop element for retaining the carriage at a work station, actuation of said stop element shifting said motor control valve to stop the motor means, and additional means responsive to said timer means for moving the stop element to release the carriage for movement, movement of the stop element to its released position normally accommodating shifting of the motor control valve to actuate the motor means, electrode means extensible into contact with said parts, power means for extending the electrodes, and limit valve means operatively interposed between the stop element and the motor control valve, said limit valve means being responsive to the position of the electrode means and preventing shifting of the motor control valve when the electrodes are extended.

3. In an apparatus for forming a composite glass article from a plurality of glass parts, a parts carriage adapted to be indexed rotationally for conveying juxtaposed parts to and from a welding station, an electrode carriage movable radially of the parts carriage, motor means for moving said electrode carriage a plurality of electrodes on the electrode carriage for contact with said parts at said station, intermittently operable motor means for indexing said parts carriage, timer means for energizing and deenergizing said motor means, locking means for retaining said parts carriage at said station, timer means for releasing said locking means, and means responsive to radial movement of said electrode carriage for overriding both said timer means for said motor and for said locking means and preventing operation of said motor means until said electrode carriage is retracted to remove said electrodes from contact with said parts.

References Cited in the file of this patent
UNITED STATES PATENTS

| | | |
|---|---|---|
| 1,920,528 | Butler et al. | Aug. 1, 1933 |
| 2,192,302 | Errett | Mar. 5, 1940 |
| 2,244,291 | Eastus | June 3, 1941 |
| 2,306,054 | Guyer | Dec. 22, 1942 |
| 2,330,668 | Briggs | Sept. 28, 1943 |
| 2,336,162 | Bridges | Dec. 7, 1943 |
| 2,349,739 | Louden et al. | May 23, 1944 |
| 2,543,093 | Braundorff | Feb. 27, 1951 |
| 2,654,181 | Lucarelli | Oct. 6, 1953 |
| 2,680,332 | Young | June 8, 1954 |
| 2,717,417 | Rigsby | Sept. 13, 1955 |
| 2,786,234 | Beyer | Mar. 26, 1957 |